US012340131B2

(12) United States Patent
Kitahashi

(10) Patent No.: US 12,340,131 B2
(45) Date of Patent: Jun. 24, 2025

(54) INFORMATION PROCESSING APPARATUS, INFORMATION PROCESSING METHOD, AND NON-TRANSITORY COMPUTER-READABLE RECORDING MEDIUM RECORDING PROGRAM

(71) Applicant: FUJIFILM Business Innovation Corp., Tokyo (JP)

(72) Inventor: Tomoki Kitahashi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 162 days.

(21) Appl. No.: 18/152,162

(22) Filed: Jan. 10, 2023

(65) Prior Publication Data
US 2023/0244426 A1  Aug. 3, 2023

(30) Foreign Application Priority Data

Feb. 3, 2022  (JP) .................. 2022-015845

(51) Int. Cl.
*G06F 3/12* (2006.01)
*H04N 1/44* (2006.01)
(52) U.S. Cl.
CPC .......... *G06F 3/1238* (2013.01); *G06F 3/1222* (2013.01); *H04N 1/4433* (2013.01); *H04N 1/4446* (2013.01); *G06F 3/1292* (2013.01)

(58) Field of Classification Search
CPC .... G06F 3/1238; G06F 3/1222; G06F 3/1292; H04N 1/4433; H04N 1/4446; H04N 1/4413
See application file for complete search history.

(56) References Cited

U.S. PATENT DOCUMENTS

| | | | |
|---|---|---|---|
| 11,030,332 B1* | 6/2021 | Gillis | G06F 21/6218 |
| 2013/0094045 A1* | 4/2013 | Nakata | G06F 3/126 358/1.13 |
| 2013/0145457 A1* | 6/2013 | Papakipos | G06F 21/6245 726/19 |

FOREIGN PATENT DOCUMENTS

| | | |
|---|---|---|
| JP | 2009053868 | 3/2009 |
| JP | 4744985 | 8/2011 |

* cited by examiner

Primary Examiner — John R Wallace
(74) Attorney, Agent, or Firm — JCIPRNET

(57) ABSTRACT

An information processing apparatus includes a processor, in which the processor causes a display, in a case where a shared access right is set to data to be processed, the data being stored in an external apparatus, to display information indicating that the data is stored in the external apparatus, before a user logs in to an apparatus that processes the data, and the processor causes the display, in a case where the shared access right is not set to the data and an access right of a specific user is set to the data, not to display the information before login, but display the information after the specific user logs in to the apparatus.

12 Claims, 7 Drawing Sheets

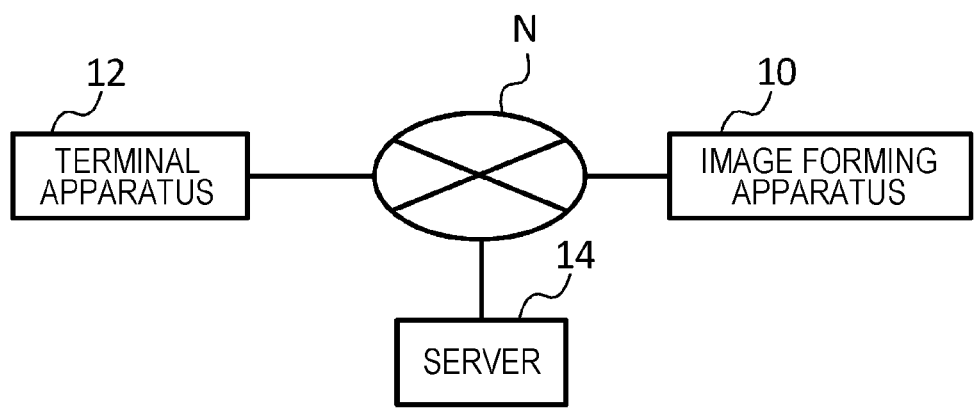
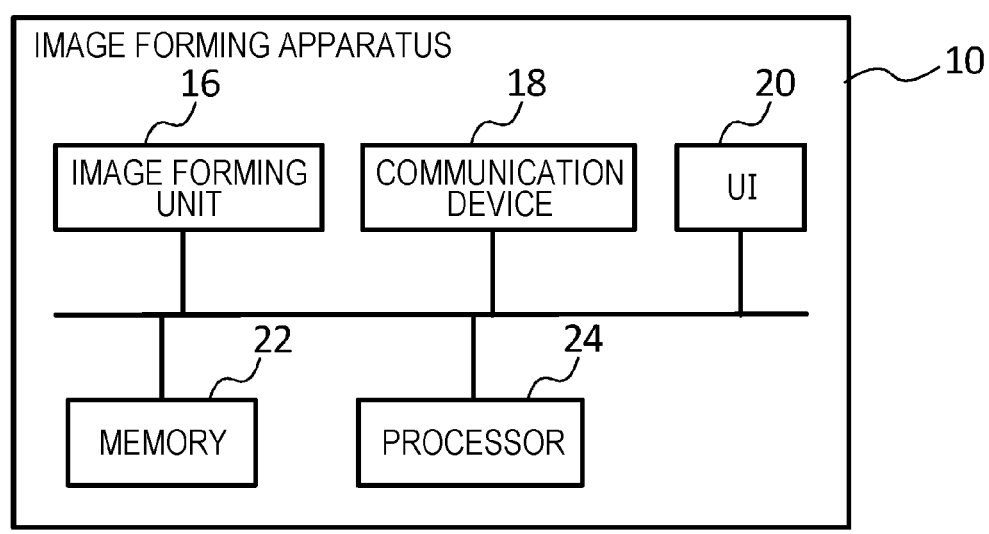

INFORMATION PROCESSING APPARATUS, INFORMATION PROCESSING METHOD, AND NON-TRANSITORY COMPUTER-READABLE RECORDING MEDIUM RECORDING PROGRAM

CROSS-REFERENCE TO RELATED APPLICATIONS

This application is based on and claims priority under 35 USC 119 from Japanese Patent Application No. 2022-015845 filed Feb. 3, 2022.

BACKGROUND

(i) Technical Field

The present invention relates to an information processing apparatus, an information processing method, and a non-transitory computer-readable recording medium recording a program.

(ii) Related Art

Apparatuses and systems are known, which acquire data stored in an external apparatus (e.g., a storage device provided in a cloud service) and process the data.

JP4744985B describes that when a file stored in a document management server is updated, the document management server notifies a user of the update of the file.

JP2009-53868A describes that the content of a notification screen displayed on a display of a device after a user logs in to the device is changed according to the authority of the user.

When data to be processed by an apparatus is stored in an external apparatus, information indicating that the data to be processed by the apparatus is stored in the external apparatus may be displayed on a display of the apparatus. In a case where the apparatus is an apparatus to be used after a user logs in to the apparatus, when the information is displayed on a display of the apparatus after the user logs in to the apparatus, the user cannot know the presence of the information from the content displayed on the display unless the user logs in to the apparatus. On the other hand, if the information is displayed on the display before the user logs in to the apparatus, the user can know the presence of the information from the content displayed on the display without logging in to the apparatus. However, if the information is always displayed on the display of the apparatus before login, a person other than the user to be notified of the information can also know the information.

SUMMARY

Aspects of non-limiting embodiments of the present disclosure relate to an information processing apparatus that improves, in a case where information indicating that data to be processed by an apparatus is stored in an external apparatus is displayed on a display of the apparatus, the convenience of a user to be notified of the information, as compared with a case where the information is displayed on the display of the apparatus after the user logs in to the apparatus at all times, and that prevents the information from being notified to a person other than the user to be notified of the information, as compared with a case where the information is displayed on the display of the apparatus before the user logs in to the apparatus at all times. Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor, wherein the processor causes a display, in a case where a shared access right is set to data to be processed, the data being stored in an external apparatus, to display information indicating that the data is stored in the external apparatus, before a user logs in to an apparatus that processes the data, and the processor causes the display, in a case where the shared access right is not set to the data and an access right of a specific user is set to the data, not to display the information before login, but display the information after the specific user logs in to the apparatus.

BRIEF DESCRIPTION OF THE DRAWINGS

FIG. 1 is a block diagram illustrating a configuration of an information processing system according to an exemplary embodiment.

FIG. 2 is a block diagram illustrating a hardware configuration of an image forming apparatus.

DETAILED DESCRIPTION

Figure 3:
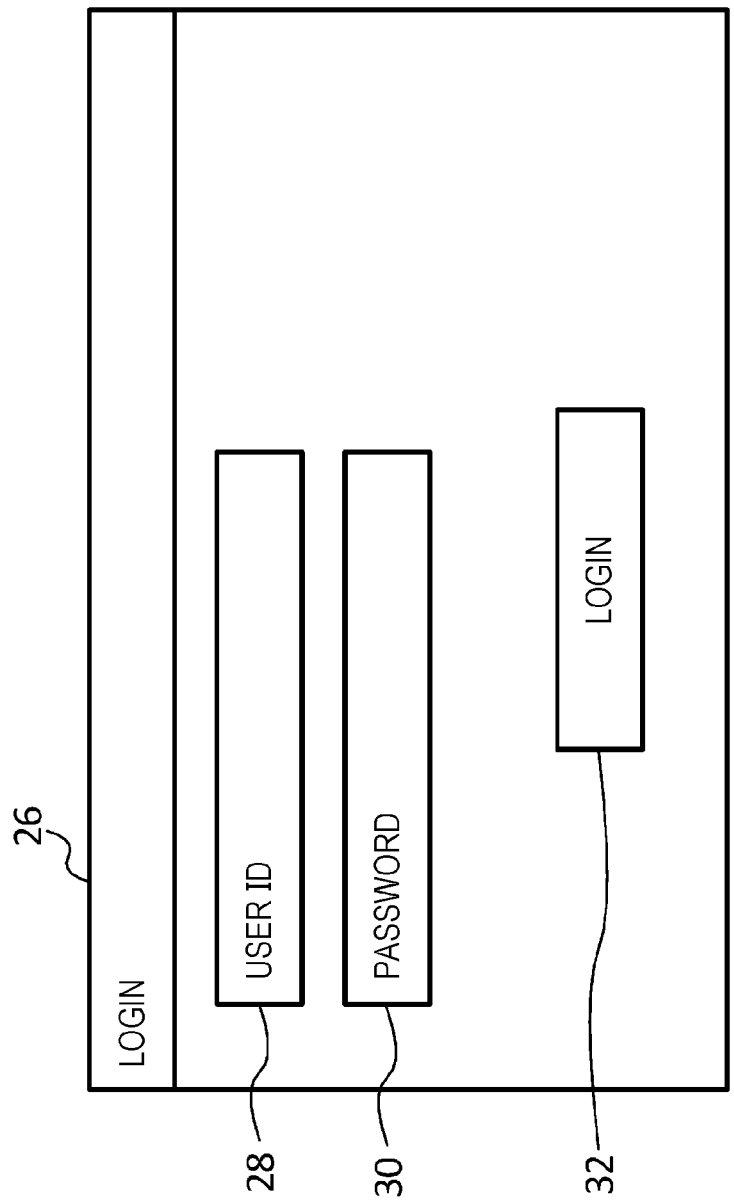
FIG. 3 is a diagram illustrating a login screen.

An information processing system according to an exemplary embodiment will be described with reference to FIG. 1. FIG. 1 is a block diagram illustrating an example of a configuration of an information processing system according to an exemplary embodiment.

The information processing system according to the exemplary embodiment includes one or more image forming apparatuses 10, one or more terminal apparatuses 12, and one or more servers 14.

Each apparatus included in the information processing system according to the exemplary embodiment has a function of communicating with another apparatus. The communication may be wired communication using a cable or may be wireless communication. That is, each apparatus may be physically connected to another apparatus by a cable to transmit and receive information to and from each other, or may transmit and receive information to and from each other by wireless communication. As the wireless communication, for example, short-range wireless communication, Wi-Fi (registered trademark), or the like is used. Wireless communication pursuant to a standard other than the wireless communication described above may be used. For example, each apparatus may communicate with another apparatus via a communication path N such as a local area network (LAN) or the Internet.

The image forming apparatus 10 is one example of an apparatus that processes data, and has at least a print function. As described below, the image forming apparatus 10 acquires data from the server 14, which is an example of an external apparatus, and prints the data. The image forming apparatus 10 may have at least one of a scan function, a copy function, and a facsimile function, in addition to the print function. The image forming apparatus 10 may be a printer or a multifunction peripheral having at least one of a scan function, a copy function, and a facsimile function in addition to a print function.

The terminal apparatus 12 is a personal computer (hereinafter, referred to as "a PC"), a tablet PC, a smartphone, a mobile phone, or the like. One or more pieces of application software are installed in the terminal apparatus 12, and work, processing, or the like is executed using the application software.

The server 14 is an example of an external apparatus, and is an apparatus that stores data. For example, the server 14 receives data from the image forming apparatus 10, the terminal apparatus 12, or another apparatus, and stores the data. The server 14 may be a server which provides a cloud service or may be a file server. The format of the data stored in the server 14 may be any format. For example, the data stored in the server 14 is data having an image format (for example, image data), data having a text format or a document format (for example, document data), data having an audio format (for example, audio data), data having a video format (for example, video data), or the like.

For example, data to be processed by the image forming apparatus 10 is transmitted from the terminal apparatus 12 to the server 14, and is stored in the server 14. The image forming apparatus 10 acquires the data from the server 14 and processes the data. For example, as data to be processed by the image forming apparatus 10, image data or document data is transmitted from the terminal apparatus 12 to the server 14, and is stored in the server 14. The image forming apparatus 10 acquires image data and document data from the server 14, and prints the acquired image data and document data.

A hardware configuration of the image forming apparatus 10 will be described with reference to FIG. 2. FIG. 2 illustrates an example of the hardware configuration of the image forming apparatus 10.

The image forming apparatus 10 includes, for example, an image forming unit 16, a communication device 18, a user interface (UI) 20, a memory 22, and a processor 24.

The image forming unit 16 has at least a print function, and prints image data and document data. The printing method is not particularly limited, and examples thereof include an electrophotographic method, an ink jet method, a thermal method, and a thermal transfer method. The image forming unit 16 may print image data or document data acquired from the server 14, or may print image data or document data acquired from an apparatus other than the server 14. The image forming unit 16 may have at least one of a scan function, a copy function, and a facsimile function, in addition to the print function. The image forming unit 16 corresponds to an example of a processing unit that processes data.

The communication device 18 includes one or more communication interfaces having a communication chip, a communication circuit, and the like, and has a function of transmitting information to another apparatus and a function of receiving information from another apparatus. The communication device 18 may have a wireless communication function or a wired communication function.

The UI 20 is a user interface and includes a display and an input device. The display is a liquid crystal display, an EL display, or the like. The input device is a keyboard, a mouse, an input key, an operation panel, or the like. The UI 20 may be, for example, a touch panel having both a display and an input device.

The memory 22 is a device constituting one or more storage areas for storing data. The memory 22 is, for example, a hard disk drive (HDD), a solid-state drive (SSD), various memories (for example, a RAM, a DRAM, an NVRAM, a ROM), other storage devices (for example, an optical disk), or a combination thereof.

The processor 24 controls operations performed by the individual components of the image forming apparatus 10.

In the present exemplary embodiment, the display of information on an apparatus that processes data is controlled by the information processing apparatus. The apparatus that processes data and the information processing apparatus may be the same apparatus or different apparatuses. In the following description, the image forming apparatus 10 is an example of the apparatus that processes data and an example of the information processing apparatus.

For example, the processor 24 causes a display of the UI 20 of the image forming apparatus 10, which is an example of the apparatus that processes data, to display various types of information.

In the exemplary embodiment, data such as image data or document data to be processed by the image forming apparatus 10 is generated by the terminal apparatus 12, is transmitted from the terminal apparatus 12 to the server 14, and is stored in the server 14. Hereinafter, the data such as image data or document data to be processed by the image forming apparatus 10 is referred to as "processing target data".

An access right may be set to the processing target data. Examples of the type of the access right include an access right with which only viewing of the processing target data is permitted (that is, an access right with which only displaying of the processing target data is permitted), an access right with which viewing, editing, and the like of the processing target data are permitted, and an access right with which viewing, editing, printing, and the like of the processing target data are permitted. The editing includes changing, deleting, and adding a part of or the entire document or image represented by the processing target data.

For example, user identification information (for example, a user ID) of a user having an access right is associated with processing target data to set the access right of the user to the processing target data. Specifically, the user identification information (for example, the user ID) of the user who is permitted to only view the processing target data, the user identification information of the user who is permitted to view and edit the processing target data, or the user identification information of the user who is permitted to view, edit, and print the processing target data is associated with the processing target data.

The access right with which only viewing of the processing target data is permitted for all users, the access right with which viewing and editing of the processing target data are permitted for all users, or the access right with which viewing, editing, and printing of the processing target data are permitted for all users may be set to the processing target data.

For example, in a case where the processing target data is transmitted to and stored in the server 14, when the user operates the terminal apparatus 12 to access the server 14, a screen of a service (for example, a cloud service) provided by the server 14 is displayed on the display of the terminal apparatus 12. On the screen, the user designates the processing target data to be stored in the server 14, and sets an access right to the processing target data. As described above, the access right may be set for each user, or the access right may be set for all the users. In addition, any access right may be set.

The user may designate the image forming apparatus 10 that processes the processing target data on the screen displayed on the terminal apparatus 12. The image forming apparatus 10 that processes the processing target data may be designated in advance.

When the user operates the terminal apparatus 12 to give an instruction to store the processing target data in the server 14, the processing target data, information indicating the access right set to the processing target data, and apparatus identification information for identifying the image forming apparatus 10 that processes the processing target data are transmitted from the terminal apparatus 12 to the server 14. Examples of the apparatus identification information include a MAC address, an IP address, a manufacturing number, and an apparatus name.

Upon receiving the processing target data, the information indicating the access right set to the processing target data, and the apparatus identification information, the server 14 stores and manages the processing target data, the information indicating the access right, and the apparatus identification information in association with each other. In addition, the server 14 stores and manages information on the processing target data.

The information on the processing target data includes, for example, information indicating a storage area in which the processing target data is stored (for example, an address such as a URL) and a name of the processing target data (for example, a file name). If the processing target data is stored in a hierarchical folder, the information on the processing target data includes information on the hierarchy of the folder.

When the processing target data is stored in the server 14, the server 14 specifies the apparatus that should process the processing target data based on the apparatus identification information associated with the processing target data, and transmits the information on the processing target data and the information indicating the access right to the specified apparatus. For example, if the apparatus identification information indicates the image forming apparatus 10, the server 14 transmits to the image forming apparatus 10 the information on the processing target data to be processed by the image forming apparatus 10 and the information indicating the access right.

By transmitting the information on the processing target data and the information indicating the access right from the server 14 to the image forming apparatus 10, the image forming apparatus 10 is notified that the processing target data to be processed by the image forming apparatus 10 is stored in the server 14.

Upon receiving the information on the processing target data and the information indicating the access right from the server 14, the processor 24 of the image forming apparatus 10 controls display of information indicating that the processing target data is stored in the server 14. Hereinafter, "the information indicating that the processing target data is stored in the server 14" is referred to as "a notification", and "controlling the display of the information indicating that the processing target data is stored in the server 14" is referred to as "controlling the display of the notification".

If a shared access right is set to the processing target data, the processor 24 displays the notification before the user logs in to the image forming apparatus 10. For example, the processor 24 causes the display of the UI 20 to display the notification.

Displaying the notification before login refers to displaying the notification on a login screen or displaying the notification on a screen other than the login screen and displayed before login. The screen other than the login screen and displayed before login is, for example, a main screen displayed before login, a screen showing a list of functions that the user can use without logging in, or other screens, and is not particularly limited.

Setting the shared access right refers to setting an access right of at least two persons. That is, at least two pieces of user identification information are associated with the processing target data. Setting the shared access right may also refer to setting an access right of persons the number of which is equal to or greater than a predetermined threshold value.

The processor 24 may continuously display the notification displayed before login even after the user logs in to the image forming apparatus 10, or may hide the notification after login. In a case where the notification is continuously displayed after login, if the user logs out of the image forming apparatus 10, the processor 24 may hide the notification or may continuously display the notification. In a case where the processing target data is processed (for example, in a case where the processing target data is printed), the processor 24 may hide the notification.

If the shared access right is not set to the processing target data, the processor 24 does not display the notification before login.

After the user logs in to the image forming apparatus 10, the processor 24 displays the notification in a case where at least the access right to view is set to the processing target data for the login user.

If the shared access right is not set to the processing target data and an access right of a specific user is set, the processor 24 does not display the notification before login, and displays the notification after the specific user logs in to the image forming apparatus 10.

For example, the processor 24 causes the display of the UI 20 of the image forming apparatus 10 to display the login screen. The processor 24 displays the notification on the login screen in a case where the shared access right is set to the processing target data, and does not display the notification on the login screen in a case where the shared access right is not set to the processing target data. If the shared access right is not set to the processing target data and the access right of the specific user is set, the processor 24 does not display the notification on the login screen, and displays the notification after the specific user logs in to the image forming apparatus 10.

An apparatus different from the image forming apparatus 10 may control the display of the login screen or the display of the notification.

Hereinafter, a specific example of an exemplary embodiment will be described in detail.

FIG. 3 illustrates a login screen 26. The login screen 26 is displayed on the display of the UI 20 of the image forming apparatus 10. The login screen 26 is displayed on the display of the UI 20 before the user logs in to the image forming apparatus 10. For example, the login screen 26 is a screen for inputting authentication information necessary for the user to log in to the image forming apparatus 10. The authentication information includes, for example, user identification information (for example, a user ID, a user account, and a user name) for identifying the user and a password.

In the example illustrated in FIG. 3, the authentication information includes a user ID and a password. On the login screen 26, an input field 28 for inputting a user ID, an input field 30 for inputting a password, and an image 32 representing a button for requesting login are displayed. When the user ID is input in the input field 28, the password is input in the input field 30, and the image 32 is pressed, the image forming apparatus 10 is requested to log in.

Upon receiving the login request, the processor 24 of the image forming apparatus 10 compares the authentication information (for example, the user ID and the password) input in the input fields 28 and 30 with authentication information (for example, a user ID and a password) registered in advance. If the authentication information input in the input fields 28 and 30 matches the authentication information registered in advance, the user authentication succeeds, and the user is permitted to log in to the image forming apparatus 10. If the authentication information input in the input fields 28 and 30 does not match the authentication information registered in advance, the user authentication fails, and the user is not permitted to log in to the image forming apparatus 10.

The login screen 26 illustrated in FIG. 3 is merely an example. Alternatively, an integrated circuit (IC) card storing authentication information may be used. In this case, the authentication information stored on the IC card may be transmitted from the IC card to the image forming apparatus 10 by short-range wireless communication or the like, and the processor 24 may authenticate the user by receiving the authentication information. In a case where such authentication is performed, the input fields 28 and 30 may be or are not necessarily displayed on the login screen 26. As another example, biometric information such as a fingerprint or a vein may be used as the authentication information. For example, a device that reads biometric information is installed in the image forming apparatus 10, the biometric information is read by the device, and the processor 24 authenticates the user using the read biometric information. Also in this case, the input fields 28 and 30 may be or are not necessarily displayed on the login screen 26. In any case, the login screen 26 is a screen displayed on the display of the UI 20 before the user logs in to the image forming apparatus 10, and information corresponding to the user authentication method may be displayed on the login screen 26.

Figure 4:
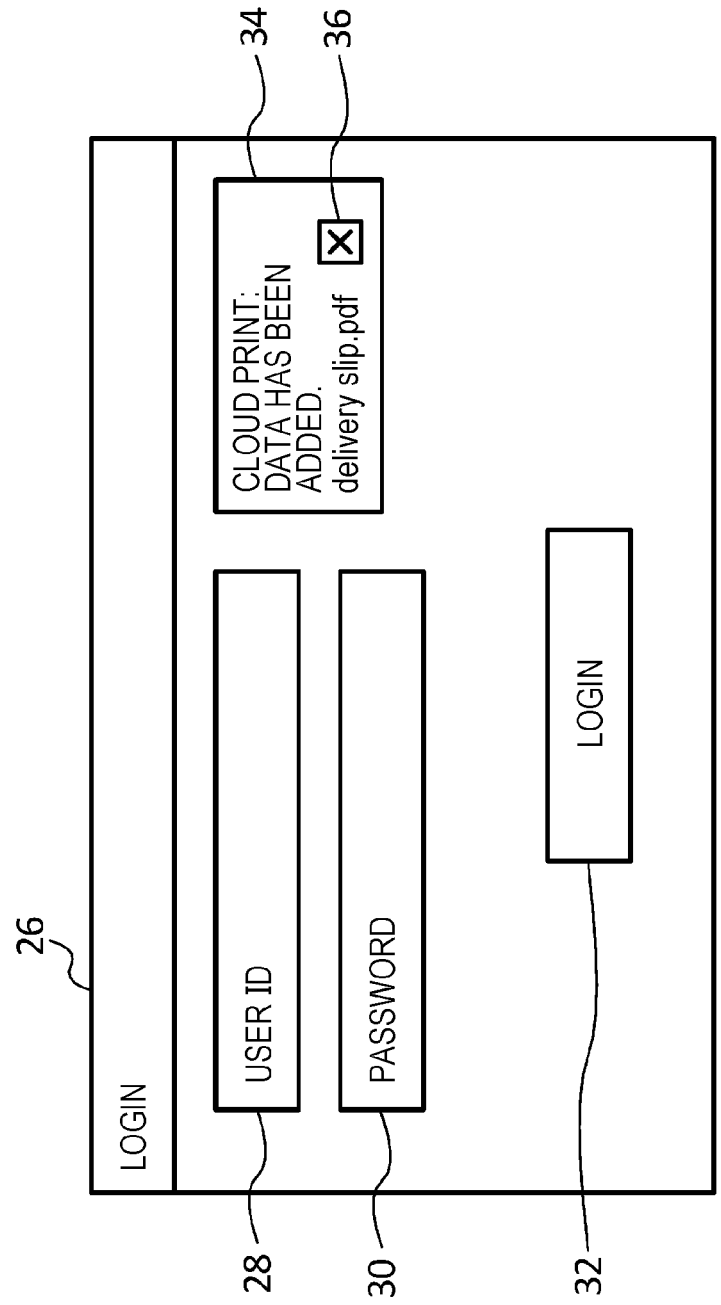
FIG. 4 is a diagram illustrating a login screen.

Hereinafter, a display example of a notification will be described with reference to FIG. 4. FIG. 4 is a diagram illustrating a login screen.

In a case where the image forming apparatus 10 receives the information on the processing target data and the information indicating the access right from the server 14, the processor 24 determines whether or not the shared access right is set to the processing target data with reference to the information indicating the access right.

In a case where the shared access right is set to the processing target data, the processor 24 displays a notification 34 on the login screen 26. The notification 34 is information indicating that the processing target data to be processed by the image forming apparatus 10 is stored in the server 14. For example, the notification 34 indicates that the processing target data of "delivery slip. pdf" is stored in the server 14.

Here, as an example, a service called "cloud print" is provided. The "cloud print" is processing of downloading the processing target data stored in the server 14 and printing the processing target data, and the server 14 provides the service. The service may be provided by an apparatus other than the server 14. For example, the service may be provided by the image forming apparatus 10.

When there are multiple pieces of processing target data to be processed by the image forming apparatus 10, notifications corresponding to the respective pieces of processing target data are displayed on the login screen 26. In a case where the multiple notifications are displayed, the notifications may be displayed so as to be entirely or partially superimposed on each other.

In a case where the notification 34 is displayed on the display before login, the processor 24 may cause the display to display an image for hiding the notification 34 before login.

For example, an image 36 representing a button for instructing hiding of the notification 34 is displayed on the login screen 26. The image 36 is displayed, for example, within a display region of notification 34. In a case where the user presses (for example, clicks or taps) the image 36, the processor 24 hides the notification 34.

Hereinafter, as an example, a case will be described, in which a user A operates the terminal apparatus 12 to create processing target data representing a delivery slip, and sends the processing target data to users B and C. The users B and C are users of the image forming apparatus 10.

In order to store the processing target data "delivery slip. pdf" in the server 14, the user A operates the terminal apparatus 12 to set an access right of the users A, B, and C to the processing target data. This access right is an access right with which at least viewing and printing are permitted to a user. When the processing target data "delivery slip. pdf" and the information indicating the access right are stored in the server 14, the information on the processing target data "delivery slip. pdf" and the information indicating the access right are transmitted from the server 14 to the image forming apparatus 10. It is assumed that the image forming apparatus 10 is designated as an apparatus that processes the processing target data "delivery slip. pdf".

Since the access right of the plurality of users (that is, the users A, B, and C) is set to the processing target data, the processor 24 determines that a shared access right is set to the processing target data. Therefore, the processor 24 displays the notification 34 before the user logs in to the image forming apparatus 10. For example, the processor 24 displays the notification 34 on the login screen 26.

On the other hand, for example, in a case where the user B stores processing target data to be used privately in the server 14, only an access right of the user B is set to the processing target data. Since the access right of the plurality of users is not set to the processing target data, the processor 24 determines that a shared access right is not set to the processing target data. In this case, the processor 24 does not display the notification on the screen before login (for example, the login screen 26), and causes the display of the UI 20 to display the notification after the user B logs in to the image forming apparatus 10. After the user B logs in to the image forming apparatus 10, the processor 24 causes the display to display a notification indicating that the processing target data to which the access right of the user B is set is stored in the server 14.

Figure 5:
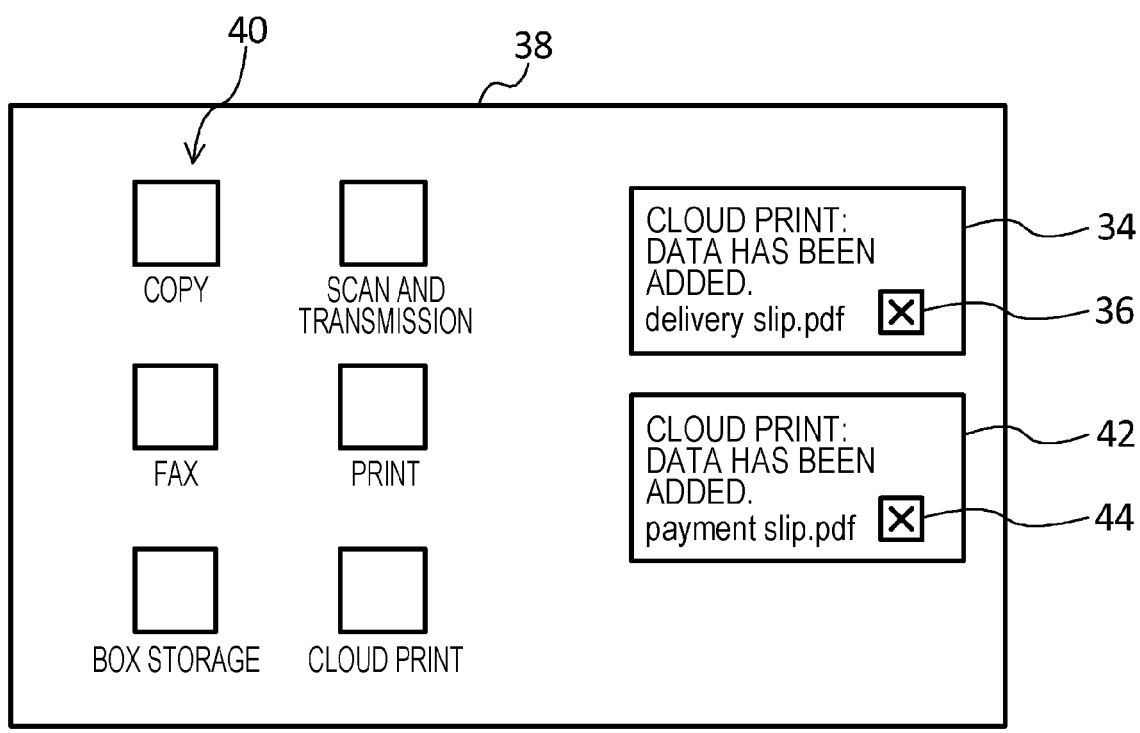
FIG. 5 is a diagram illustrating a menu screen.

Next, description will be given for a screen displayed after login with reference to FIG. 5. FIG. 5 illustrates a menu screen 38. The menu screen 38 is an example of a screen displayed after the user B logs in to the image forming apparatus 10.

On the menu screen 38, a list 40 of functions that can be executed using the image forming apparatus 10 is displayed.

For example, an image (for example, an icon) representing each function is displayed on the menu screen 38.

Here, as an example, a copy function, a scan and transmission function, a fax function, a print function, a box storage function, a cloud print function, and the like are included in the list 40, and images representing the respective functions are displayed. The scan and transmission function is a function of transmitting image data generated by scanning performed by the image forming apparatus 10 to another apparatus (for example, a PC or a server). The box storage function is a function of storing image data generated by scanning performed by the image forming apparatus 10 in a storage area formed in the memory 22 of the image forming apparatus 10. The cloud print function is a function of downloading the processing target data stored in the server 14 and printing the processing target data. The user can designate a function included in the list 40 and give an instruction to execute the designated function to the image forming apparatus 10.

In addition, notifications 34 and 42 are displayed on the menu screen 38. As described above, since the shared access right (that is, the access right of the users A, B, and C) is set to the processing target data "delivery slip. pdf", the notification 34 is displayed on the menu screen 38 displayed after the user B logs in to the image forming apparatus 10. Of course, the processor 24 may hide the notification 34 after the user B logs in to the image forming apparatus 10. For example, the processor 24 does not necessarily display the notification 34 on the menu screen The notification 42 is information indicating that processing target data "payment slip. pdf" is stored in the server 14. Only an access right of the user B is set to the processing target data "payment slip. pdf". That is, a shared access right is not set to the processing target data "payment slip. pdf". In this case, the processor 24 does not display the notification 42 before login, and displays the notification 42 after the user B logs in to the image forming apparatus 10. For example, the processor 24 does not display the notification 42 on the login screen 26, but displays the notification 42 on the menu screen 38.

Since an access right of another user other than the user B is not set to the processing target data "payment slip. pdf", even if another user other than the user B (for example, the user C) logs in to the image forming apparatus 10, the notification 42 is not displayed after login. For example, even if the user C logs in to the image forming apparatus 10 and the menu screen is displayed, the notification 42 is not displayed on the menu screen. This prevents the notification 42 from being viewed by another user other than the user B (for example, the user C who uses the image forming apparatus 10).

The notification may be displayed before login under each condition described below.

Condition 1

In a case where processing target data is associated with a specific name and a shared access right is set to the processing target data, the processor 24 may display a notification before login. For example, the processor 24 displays a notification on a login screen. The specific name may be set by, for example, a user or may be set in advance.

In a case where the processing target data is not associated with the specific name, the processor 24 does not display the notification before login even if the shared access right is set to the processing target data.

For example, in a case where the file name of the processing target data is "delivery slip *.pdf" and the shared access right is set to the processing target data, the processor 24 displays the notification before login. Note that "*" in the file name means any character string. For the processing target data having a file name other than "delivery slip *.pdf", the notification is not displayed before login even if the shared access right is set.

In the case where the processing target data is associated with the specific name, the processor 24 may display the notification before login even if the shared access right is not set to the processing target data. That is, in a case where the processing target data has a specific file name, the processor 24 may display the notification before login regardless of whether or not the shared access right is set to the processing target data.

For example, in the case where the file name of the processing target data is "delivery slip *.pdf", the processor 24 displays the notification before login regardless of whether or not the shared access right is set to the processing target data. The notification of the processing target data having the file name other than "delivery slip *.pdf" is not displayed before login.

Condition 2

In a case where processing target data is stored in a specific storage area and a shared access right is set to the processing target data, the processor 24 may display a notification before login. For example, the processor 24 displays a notification on a login screen. The specific storage area may be set by, for example, a user or may be set in advance.

The specific storage area is, for example, a specific folder, and may be formed in the server 14 or may be formed in another apparatus other than the server 14.

In a case where the processing target data is not stored in the specific folder, the processor 24 does not display the notification before login even if the shared access right is set to the processing target data.

Using the example of the above-described delivery slip, in a case where processing target data is stored in a folder dedicated to a delivery slip and a shared access right is set to the processing target data, the processor 24 displays a notification before login. In a case where processing target data is not stored in the folder dedicated to the delivery slip, the processor 24 does not display a notification before login even if a shared access right is set to the processing target data. The folder dedicated to the delivery slip may be a folder that the users B and C are permitted to access.

In the case where the processing target data is stored in the specific storage area and the shared access right is not set to the processing target data, the processor 24 may display the notification before login. That is, in a case where the processing target data is stored in the specific folder, the processor 24 may display the notification before login regardless of whether or not the shared access right is set to the processing target data.

Condition 3

In a case where an access right of a user prohibited from storing personal data in the server 14 is set to processing target data and a shared access right is set to the processing target data, the processor 24 may display a notification before login. For example, the processor 24 displays a notification on a login screen. A user prohibited from storing personal data in the server 14 is determined in advance, and user identification information for identifying the user is stored in advance in the memory 22 of the image forming apparatus 10 and the server 14.

For example, the user B is registered in the image forming apparatus 10 and the server 14 as a user who does not handle data other than the processing target data representing the delivery slip in the cloud service. In a case where an access right of the user B and an access right of another user other than the user B are set to the processing target data representing the delivery slip, the processor 24 displays a notification before login.

In a case where the access right of the user prohibited from storing the personal data in the server 14 is set to the processing target data, the processor 24 may display only the notification of the processing target data to which the access right of the user is set before login regardless of whether or not the shared access right is set to the processing target data. For example, in the case where the user B is registered in the image forming apparatus 10 and the server 14 as a user who does not handle data other than the processing target data representing the delivery slip in the cloud service, the processor 24 displays only the notification of the processing target data to which the access right of the user B is set before login. Thus, the notification of the personal data (for example, the personal data of the user C) is not displayed before login.

For example, a combination (for example, an AND condition or an OR condition) of a plurality of conditions among the above-described conditions 1 to 3 may be set, and a notification may be displayed before login in accordance with the combination.

Figure 6:
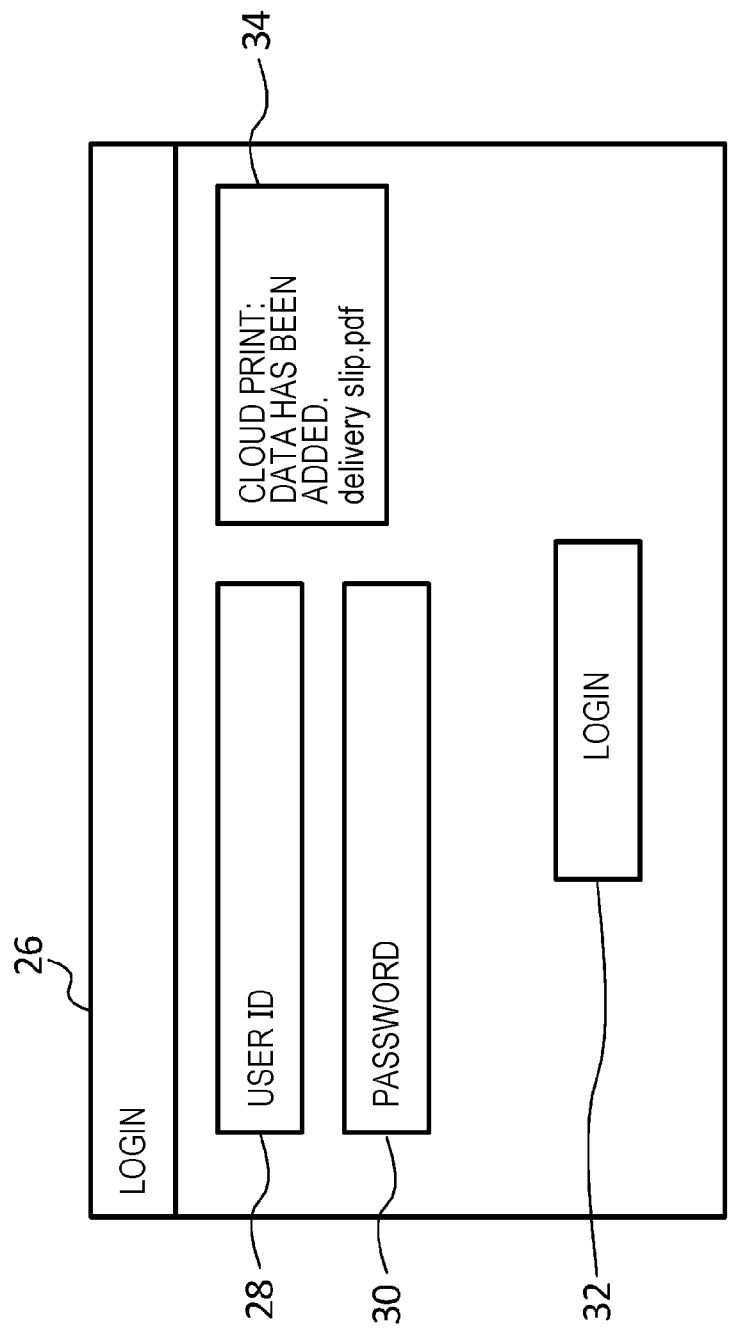
FIG. 6 is a diagram illustrating a login screen.

In a case where a notification is displayed before login, such as a case where a notification is displayed on a login screen, an image representing a button for giving an instruction to hide the notification is not necessarily displayed before login. For example, as illustrated in FIG. 6, in a case where the notification 34 is displayed on the login screen 26, an image 36 representing a button for giving an instruction to hide the notification 34 is not displayed on the login screen 26. This prevents the notification 34 from being hidden by a user operation before login.

In this case, as illustrated in FIG. 5, an image representing a button for giving an instruction to hide a notification (for example, images 36 and 44) is displayed on the screen after login.

After the user logs in to the image forming apparatus 10, in a case where an operation is performed by the user in response to the notification, the processor 24 may cause the display of the UI 20 to display a screen for processing the processing target data corresponding to the notification on which the operation is performed (for example, a screen for setting the processing).

For example, when the user B logs in to the image forming apparatus 10, the menu screen 38 illustrated in FIG. 5 is displayed on the display of the UI 20. As illustrated in FIG. 5, the notifications 34 and 42 are displayed on the menu screen 38.

In a case where the notification 34 is operated by the user on the menu screen 38 (for example, in a case where the notification 34 is clicked or touched), the processor 24 causes the display to display a screen for processing the processing target data corresponding to the notification 34 (that is, the processing target data representing the delivery slip).

The processing target data is associated in advance with information indicating processing to be executed on the processing target data. The processing to be executed on the processing target data may be designated by the user who has transmitted the processing target data to the server 14, or may be determined in advance.

For example, information indicating print such as cloud print is associated with the processing target data representing the delivery slip as an example of processing. In this case, when the notification 34 is operated by the user, the processor 24 causes the display to display a screen for executing print (for example, a setting screen for print). Here, as an example, it is assumed that information indicating cloud print is associated with processing target data as an example of information indicating processing.

Figure 7:
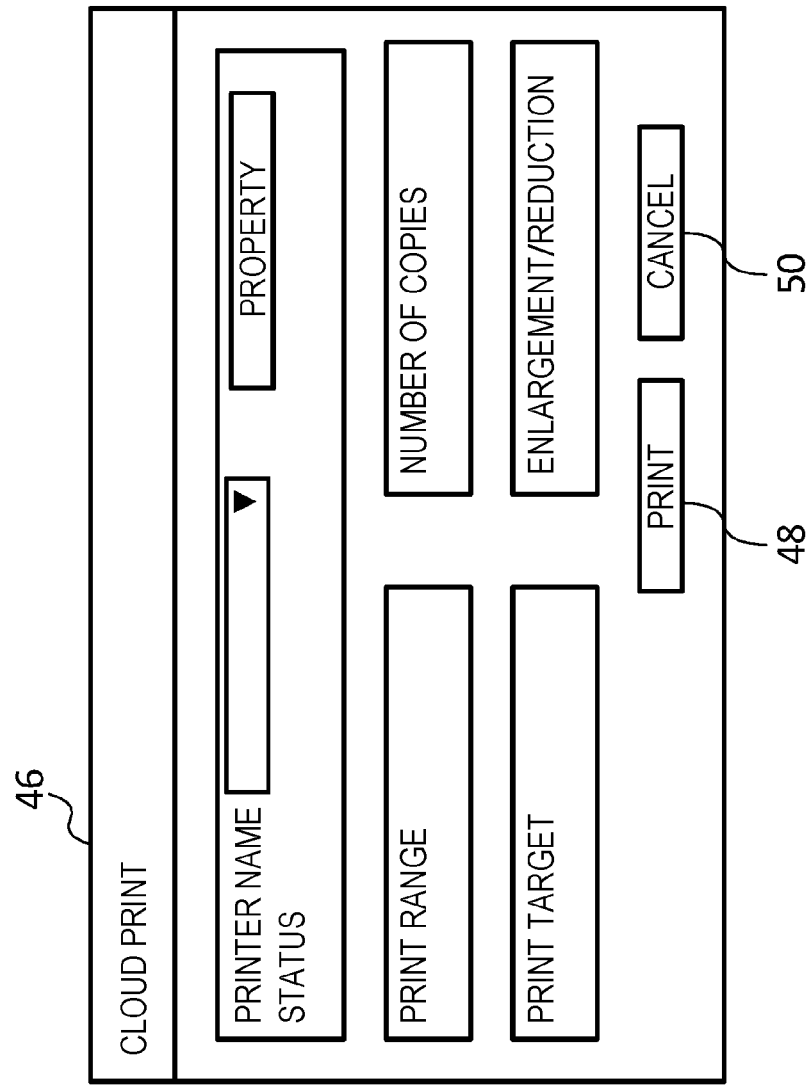
FIG. 7 is a diagram illustrating a setting screen of cloud print.

FIG. 7 illustrates a setting screen 46 for cloud print. When the notification 34 is operated by the user, the setting screen 46 is displayed on the display of the UI 20. The setting screen 46 displays a field for selecting a printer, a field for setting a print range, a field for setting a print target, a field for setting the number of copies to be printed, a field for setting enlargement or reduction, and the like. On the setting screen 46, conditions and the like for the cloud print are set.

Images 48 and 50 such as an icon are displayed on the setting screen 46. The image 48 is an image representing a button for giving an instruction to execute the cloud print. The image 50 is an image representing a button for giving an instruction to cancel the cloud print.

In a case where the image 48 is pressed by the user (for example, in a case where the image 48 is clicked or touched), the processor 24 downloads the processing target data corresponding to the notification 34 (that is, the processing target data representing the delivery slip) from the server 14 and causes the image forming unit 16 to print the processing target data.

In a case where a user who has an access right to the processing target data logs in to the image forming apparatus 10 and then logs out of the image forming apparatus 10, the processor 24 does not necessarily cause the display of the UI 20 to display a notification of the processing target data to which the access right of the user is set.

For example, as illustrated in FIG. 4, in a case where the notification 34 is displayed on the login screen 26 and the user B logs in to the image forming apparatus 10 and then logs out of the image forming apparatus 10, the processor 24 causes the display of the UI 20 to display the login screen on which the notification 34 is not displayed, as illustrated in FIG. 3.

On the other hand, in a case where a user who does not have an access right to the processing target data logs in to the image forming apparatus 10 and then logs out of the image forming apparatus 10, the processor 24 causes the display of the UI 20 to display a notification.

For example, as illustrated in FIG. 4, in the case where the notification 34 is displayed on the login screen 26, when a user whose access right is not set to the processing target data corresponding to the notification 34 logs in to the image forming apparatus 10 and then logs out of the image forming apparatus 10, the processor 24 causes the display of the UI 20 to display the login screen 26 on which the notification 34 is displayed, as illustrated in FIG. 4.

As described above, when the user who has the access right to the processing target data corresponding to the notification logs in to the image forming apparatus 10, the notification is not displayed after logout. On the other hand, when the user who does not have the access right to the processing target data corresponding to the notification logs in to the image forming apparatus 10, the notification is displayed even after logout. That is, if it is estimated that the user who should see the notification has seen the notification, the notification is not displayed after logout; otherwise, the notification is displayed after logout.

When the processing target data is processed (for example, printed) by the image forming apparatus 10, the processor 24 does not display the notification corresponding to the processing target data on the screen before login (for example, the login screen).

For example, as illustrated in FIG. 4, in the case where the notification 34 is displayed on the login screen 26, when the user logs in to the image forming apparatus 10 and the processing target data corresponding to the notification 34 is printed, the processor 24 does not display the notification 34 on the login screen 26 displayed after logout, as illustrated in FIG. 3.

The processor 24 may hide the notification after a predetermined time has elapsed from a time point at which the notification is displayed on the screen before login.

The processing target data may be data to be processed by any apparatus among a plurality of apparatuses. In a case where a notification corresponding to the data is displayed on each of the plurality of apparatuses before login, the notification is hidden when the data is processed by one of the plurality of apparatuses. That is, the notification displayed on the apparatus that has processed the data is not displayed, and the notification displayed on another apparatus that has not processed the data is not displayed.

Hereinafter, with reference to FIG. 8, a case where the processing target data is processed by any apparatus among a plurality of image forming apparatuses 10 will be described.

Figure 8:
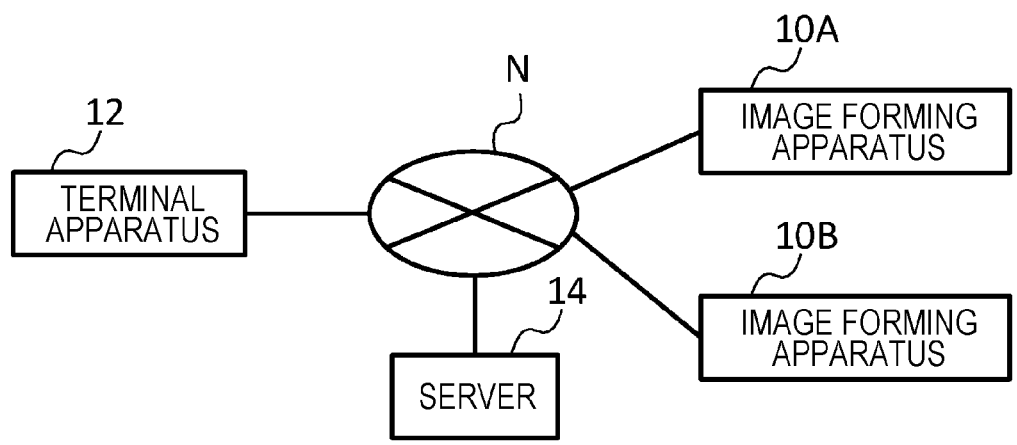
FIG. 8 is a block diagram illustrating a configuration of an information processing system according to a modification.

In FIG. 8, an information processing system includes image forming apparatuses 10A and 10B. The image forming apparatuses 10A and 10B have the same configuration as the image forming apparatus 10.

For example, processing target data to be processed by one of the image forming apparatuses 10A and 10B is stored in a server 14, and information on the processing target data and information indicating an access right are transmitted from the server 14 to the image forming apparatuses 10A and 10B. The information on the processing target data includes apparatus identification information of each of the image forming apparatuses 10A and 10B.

Upon receiving the information on the processing target data and the information indicating the access right from the server 14, a processor 24 of each of the image forming apparatuses 10A and 10B causes the display of the UI 20 of the image forming apparatus 10A (10B) to display a notification indicating that the processing target data is stored in the server 14 before login. For example, as illustrated in FIG. 4, the processor 24 of each of the image forming apparatuses 10A and 10B causes a display of a UI 20 of the image forming apparatus 10A (10B) to display a login screen 26 and displays a notification 34 on the login screen 26. As described above, the notification 34 is displayed on the display of the UI 20 of each of the image forming apparatuses 10A and 10B before login.

When the processing target data is downloaded from the server 14 and printed by one of the image forming apparatuses 10A and 10B (for example, the image forming apparatus 10A), the processor 24 of the image forming apparatus 10A that has printed the processing target data does not display the notification 34 on the screen before login (for example, the login screen 26).

The processor 24 of the image forming apparatus 10A transmits information indicating that the processing target data has been processed (that is, information indicating that the processing target data has been printed) to the image forming apparatus 10B via or without via the server 14. As a result, the processor 24 of the image forming apparatus 10B recognizes that the processing target data has been processed by the image forming apparatus 10A, and does not display the notification 34 on the screen before login (for example, the login screen 26). As a result, it is possible to prevent the same processing target data from being processed redundantly in the image forming apparatus 10B.

In the above-described exemplary embodiment, information indicating a subfolder storing the processing target data may be included in the above-described notification and displayed on the screen before login or the screen after login.

In the above-described exemplary embodiment, an example of an apparatus that processes data is the image forming apparatus 10 having the print function, and an example of data processing is print; however, the apparatus that processes data may be an apparatus other than the image forming apparatus 10, and data processing may be processing other than print.

For example, the data processing may be image processing, encryption processing, decryption processing, transfer processing, display processing, or the like. The apparatus that processes data may be an apparatus that performs image processing, an apparatus that performs encryption processing, an apparatus that performs decryption processing, an apparatus that performs transfer processing, an apparatus that performs display processing, or the like.

The functions of the image forming apparatuses 10, 10A and 10B are realized by, for example, cooperation of hardware and software. For example, the processor reads and executes the program stored in the memory of each apparatus to realize the function of each apparatus. The program is stored in the memory via a recording medium, such as a compact disc (CD) or a digital versatile disc (DVD), or via a communication path, such as a network.

In each of the above-described exemplary embodiments, the processor refers to a processor in a broad sense, and includes a general-purpose processor (for example, a central processing unit (CPU)) and a dedicated processor (for example, a graphics processing unit (GPU), an application specific integrated circuit (ASIC), a field programmable gate array (FPGA), a programmable logic device). The operation of the processor in each of the above-described exemplary embodiments may be performed not only by one processor but also by a plurality of physically separated processors cooperating with each other. In addition, the order of the respective operations of the processor is not limited to the order described in each of the above-described exemplary embodiments, and may be appropriately changed.

What is claimed is:

1. An information processing apparatus comprising a processor, wherein
the processor causes a display, in a case where a shared access right is set to data to be processed, the data being stored in an external apparatus, to display information indicating that the data is stored in the external apparatus on a login screen, before a user logs in to an apparatus that processes the data, and
the processor causes the display, in a case where the shared access right is not set to the data and an access right of a specific user is set to the data, not to display the information on the login screen before login, but display the information after the specific user logs in to the apparatus.

2. The information processing apparatus according to claim 1, wherein the processor causes the display, in a case where the data is associated with a specific name and the shared access right is set to the data, to display the information before login.

3. The information processing apparatus according to claim 1, wherein
the processor causes the display, in a case where the data is stored in a specific storage area and the shared access right is set to the data, to display the information before login.

4. The information processing apparatus according to claim 1, wherein
the processor causes the display, in a case where an access right of a predetermined user prohibited from storing personal data in the external apparatus is set to the data and the shared access right is set to the data, to display the information before login.

5. The information processing apparatus according to claim 1, wherein
the processor causes the display, in a case where the shared access right is set to the data and a user having an access right to the data logs in to the apparatus, to display the information after login, and
the processor causes the display, in a case where an operation is performed on the information displayed on the display after login, to display a screen for processing the data.

6. The information processing apparatus according to claim 1, wherein
the processor causes the display, in the case where the shared access right is set to the data, to display before login an image for hiding the information displayed before login.

7. The information processing apparatus according to claim 1, wherein
the processor causes the display, in a case where a user having an access right to the data logs in to the apparatus and then logs out of the apparatus, not to display the information, and
the processor causes the display, in a case where a user who does not have an access right to the data logs in to the apparatus and then logs out of the apparatus, to display the information.

8. The information processing apparatus according to claim 1, wherein
the processor does not display the information on a screen before login in a case where the data is processed.

9. The information processing apparatus according to claim 1, wherein
the data is data to be processed by any of a plurality of apparatuses, and
the processor does not display the information on a screen before login in a case where the data is processed by one of the plurality of apparatuses.

10. Information processing apparatus according to claim 1, wherein the processor is further configured to assign a shared access right to data to be processed by setting the access right to at least two specific names.

11. An information processing method comprising:
causing a display, in a case where a shared access right is set to data to be processed, the data being stored in an external apparatus, to display information indicating that the data is stored in the external apparatus on a login screen, before a user logs in to an apparatus that processes the data; and
causing the display, in a case where the shared access right is not set to the data and an access right of a specific user is set to the data, not to display the information before login, but display the information on the login screen after the specific user logs in to the apparatus.

12. A non-transitory computer-readable recording medium recording a program for operating a computer to cause
a display, in a case where a shared access right is set to data to be processed, the data being stored in an external apparatus, to display information indicating that the data is stored in the external apparatus on a login screen, before a user logs in to an apparatus that processes the data, and
the display, in a case where the shared access right is not set to the data and an access right of a specific user is set to the data, not to display the information before login, but display the information on the login screen after the specific user logs in to the apparatus.

* * * * *